United States Patent
Watabe

(10) Patent No.: US 7,689,039 B2
(45) Date of Patent: Mar. 30, 2010

(54) IMAGE PROCESSING EQUIPMENT

(75) Inventor: Naoki Watabe, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 888 days.

(21) Appl. No.: 11/467,082

(22) Filed: Aug. 24, 2006

(65) Prior Publication Data
US 2007/0047767 A1 Mar. 1, 2007

(30) Foreign Application Priority Data
Aug. 30, 2005 (JP) ............... 2005-250264

(51) Int. Cl.
*G06K 9/00* (2006.01)
(52) U.S. Cl. ............ 382/181; 382/190; 382/203
(58) Field of Classification Search ............ 296/187.04; 382/181, 109, 197, 203
See application file for complete search history.

(56) References Cited
U.S. PATENT DOCUMENTS
7,050,607 B2* 5/2006 Li et al. ................ 382/118

2007/0154063 A1* 7/2007 Breed .................... 382/100

FOREIGN PATENT DOCUMENTS
JP 2003-284057 A 10/2003

* cited by examiner

*Primary Examiner*—Andrew W Johns
*Assistant Examiner*—Gregory F Cunningham

(57) ABSTRACT

A design for the high speed identification of a pedestrian at an image is provided, having an input feature vector generation unit 23b for generating, based on an image of an object, an input feature vector u that includes as elements the object's size, the object's upper portion shape, and the object's side portion shape; a kernel discriminant analysis operations unit 23c for generating a vector y mapped to the discriminant space, through performing operations for kernel discriminant analysis based on the input feature vector, and an object determination unit 23d for determining whether the object is a pedestrian or not, depending on whether or not this vector y is within a fixed area at the discriminant space.

18 Claims, 10 Drawing Sheets

IMAGE PROCESSING EQUIPMENT

CROSS-REFERENCE TO RELATED APPLICATIONS

This application claims priority under 35 U.S.C. 119 based upon Japanese Patent Application Serial No. 2005-250264, filed on Aug. 30, 2005. The entire disclosure of the aforesaid application is incorporated herein by reference.

FIELD OF THE INVENTION

The present invention relates to image processing equipment and more particularly, to the distinguishing of objects detected from snapshot images.

BACKGROUND OF THE INVENTION

Conventionally, a technique has been developed wherein two cameras are mounted at a vehicle and take photographs of frontward images. Then, using those photographed images, the distance to objects at the front of the vehicle is measured.

With this technique, based on the distance between the object and the vehicle, an alarm is emitted from a display or the speakers, to the driver and the crew. Also, the vehicle's travel motions are controlled through control devices such as the brake or the engine.

For such vehicle controls, in particular, identifying whether the object at the vehicle's front is a pedestrian or not is an important element of the technique.

Regarding a vehicle periphery observation device mentioned in Japanese Patent Application Publication No. 2003-284057, an image photographed via an infrared radiation camera is processed and whether a pedestrian at the front is detected. An alarm is emitted when the possibility of a collision between the detected pedestrian and the vehicle is high.

However, the vehicle periphery observation device of this patent literature presupposes the use of an infrared radiation camera, and its image processing is done based on the heat emitted by the human body. Because of this, there is a concern that the accuracy of the pedestrian detections may fall, due to environmental fluctuations from day-night changes or the seasons.

In other words, as an example when the temperature difference between the human body and the surrounding ambient atmosphere is small, the efficiency of this observation device drops, and there is a fear that the pedestrian will not be properly detected.

An object of the present invention is to devise the high accuracy identification of pedestrians, with data based on images.

Additionally, another object of the invention is to devise the speeding up of the above-mentioned pedestrian identification, while controlling the operational load to be smaller.

SUMMARY OF THE INVENTION

In order to solve the problems incurred, a first invention provides an image processing equipment for performing kernel discriminant analysis, based on a photographed image of an object.

This image processing equipment has an input feature vector generation unit, a discriminant analysis operation unit, and an object determination unit.

The input feature vector generation unit generates, based on data relating to the image, an input feature vector that includes as elements a size of the object, an upper portion shape of the object, and a side portion shape of the object.

The discriminant analysis operations unit generates a vector mapped to a discriminant space, through performing operations for kernel discriminant analysis based on the input feature vector.

The object determination unit determines whether the object is a pedestrian or not, according to whether or not the vector mapped to the discriminant space exists within a fixed area at the discriminant space.

For the first invention, the size of the object includes an absolute size width and an absolute size length, calculated based on an area in which the concerned object was photographed and on a distance to the concerned object.

Furthermore, for the first invention, it may be preferable if, at respective sections from dividing at a fixed width in a horizontal direction an area in which the concerned object was photographed, an upper portion shape of the object is characterized through representative values of the object's length in a vertical direction from a bottom edge of the above-mentioned area to a top edge of the object.

For the first invention, it may be desirable if the input feature vector generation unit normalizes the above-mentioned representative values for height in the vertical direction, and also normalizes a number of sections to a fixed number, as elements of the input feature vector.

Additionally, for the first invention, it may be preferable if, at respective sections from dividing at a fixed width in a vertical direction an area in which the concerned object was photographed, a side portion shape of the object is characterized through representative values of the object's lengths in a horizontal direction, from a right edge of the area to a left edge of the object, and through representative values of the object's lengths from a left edge of the area to a right edge of the object.

For the first invention, it may be desirable if the input feature vector generation unit normalizes the representative values of the object's length from the right edge of the area to the left edge of the object, for width in the horizontal direction, and also normalizes a number of sections to a fixed number, and also normalizes the representative values of the object's length from the left edge of the area to the right edge of the object, for width in the horizontal direction, and also normalizes a number of sections to a fixed number.

For the first invention, it may be preferable if the discriminant space is configured for the input feature vector using, as a basis, an eigenvector of a fixed matrix related to a first training data of the object's being a pedestrian, and to a second training data of the object's being other than a pedestrian, and wherein the discriminant analysis operations unit generates a fixed kernel feature vector, based on the input feature vector related to the object which is generated through the input feature vector generation unit, and also based on the first and the second training data stored in advance, together with generating a vector mapped to the discriminant space, based on the concerned generated kernel feature vector and on the above-mentioned matrix.

For the first invention, it may be preferable to have a stereo camera for photographing a basis image and a comparison image corresponding to the basis image, a stereo image processing unit for calculating parallax error for each fixed small area configuring the basis image, based on the photographed basis image and the comparison image, and further having an object recognition unit for recognizing the existence of the object based on the calculated parallax error for the small areas, where the input feature vector generation unit generates the input feature vector based on the calculated parallax error regarding the recognized object.

Also, the first invention may further have a score accumulation unit for accumulating fixed scores for the same object appearing at a series of plural frames, wherein the score expresses a likeness to a pedestrian of the object at an image of 1 frame and depends on a determination result related to the object through the object determination unit, and further having a score judgment unit for judging whether that same object at the plural frames is a pedestrian or not, based on the accumulated scores.

For the first invention, it may also be desirable if the score accumulation unit adds or subtracts a fixed value depending on the determination result of the object determination unit, and accumulates the scores, and if the accumulated score is larger than a fixed first threshold value, the score judgment unit judges that same object at the plural frames to be a pedestrian, and if the accumulated score is smaller than a fixed second threshold value, which is smaller than the first threshold value, the score judgment unit judges that same object to not be a pedestrian.

For the first invention, it may be preferable to have a precondition judgment unit, for judging preconditions of whether or not to carry out pedestrian identification through kernel discriminant analysis regarding the object, and if a judgment result of the precondition judgment unit is that the object satisfies the preconditions and also a judgment result of the object determination unit is that the object is a pedestrian, then the score accumulation unit adds a first fixed value regarding the object; and if a judgment result of the precondition judgment unit is that the object satisfies the preconditions and also a judgment result of the object determination unit is that the object is other than a pedestrian, then the score accumulation unit subtracts a second fixed value, which is smaller than the first fixed value, regarding the object; and if a judgment result of the precondition judgment unit is that the object does not satisfy the preconditions, then the score accumulation unit subtracts a third fixed value which is larger than the second fixed value and smaller than the first fixed value, regarding the object.

For the first invention, it may be preferable if the score accumulation regarding the object through the score accumulation unit and the judgment based on the accumulated scores through the score judgment unit, are carried out for each successive frame, and if the accumulated score for the same object up to a previous frame is larger than a fixed third threshold value, the accumulation of scores through said score accumulation unit is not performed, and the score judgment unit judges that the same object at the plural frames is a pedestrian.

For the first invention, it may be desirable if the score accumulation regarding the object through the score accumulation unit and the judgment based on the accumulated scores through the score judgment unit, are carried out for each successive frame, and the score judgment unit prepares separately the respective threshold value for when the accumulated score is increasing and the threshold value for when the accumulated score is decreasing, and establishes the threshold value for when the accumulated score is decreasing to be smaller than the threshold value for when the accumulated score is increasing.

For a second invention, an image processing equipment for distinguishing pedestrians based on a photographed image of an object is provided. This image processing equipment has an input feature vector generation unit, an operations unit, and an object determination unit.

The input feature vector generation unit generates, based on data related to the image, an input feature vector including as elements the object's size, the object's upper portion shape, and the object's side portion shape.

The operations unit generates a vector mapped to a specified space, based on the input feature vector.

The object determination unit determines whether the object is a pedestrian or not, depending on whether or not the vector mapped to the specified space is within a specified area at the space, which has established an identification boundary.

With the present invention, kernel discriminant analysis is performed based on an image of an object. In other words, first, an input feature vector is generated based on the photographed image of the object.

An operation for kernel discriminant analysis are performed based on this input feature vector, and a vector mapped to a discriminant space is generated through this operation. Then, it is determined whether the above-mentioned object is a pedestrian or not, depending on whether or not this mapped vector is within a fixed area at the discriminant space.

In particular, the input feature vector includes as its elements the object's size, the object's upper portion shape. Through that, the objects features are precisely captured, and whether the object is a pedestrian or not can be identified with high accuracy.

In addition, through the arrangement of this input feature vector, the operations burden of the pedestrian identification processing can be controlled to be lower, while performing the identification processing at high speed.

DETAILED DESCRIPTION OF THE INVENTION

Figure 1:
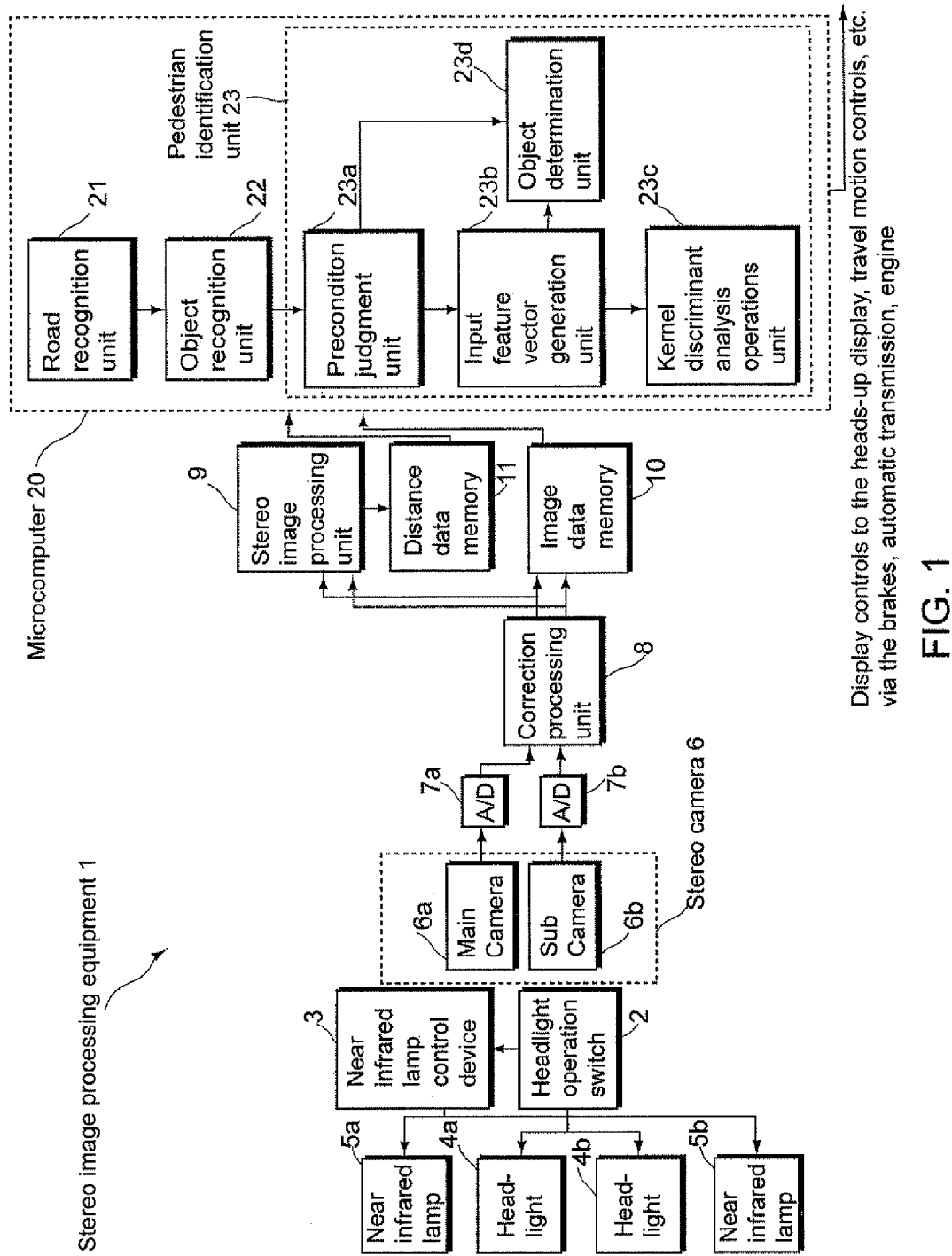
FIG. 1 is a block diagram showing a configuration of the stereo image processing equipment of a first embodiment.

FIG. 1 is a block diagram showing a main configuration of a stereo image processing equipment 1 relating to a first embodiment. This stereo image processing equipment I is loaded on a vehicle. Based on the stereo image processing, the vehicle's external monitored information at the vehicle's front is obtained. This monitored information and other driving support information is transmitted to the driver.

In particular, the stereo image processing equipment 1, based on the photographed object's image within the stereo image (the latter's standard image and a comparison image), a kernel discriminant analysis is done. According to this, it is possible to identify whether the object is a pedestrian or not.

The headlight operation switch 2 of the stereo image processing equipment 1 is a switch which the driver manually turns on/off. Accompanying the turning on of the headlight operation switch 2, a pair of headlights 4a, 4b, a pair of near infrared lamps 5a, 5b, and a heads-up display which is not illustrated, etc. are turned on. The near infrared lamp control device 3 may detect that it is nighttime, etc., and turn on the near infrared lamps 5a, 5b.

Headlights 4a, 4b are respectively installed at the vehicle's front portion right side, left side, and visible light is irradiated to the front of the vehicle. In addition, the near infrared lamps 5a, 5b are respectively arranged in the vicinities of the headlights 4a, 4b, and near infrared light is irradiated to the front of the vehicle. This near infrared lamp 5a, 5b can be configured through installing visible light cut filters on lamps that irradiate visible light, and also, near infrared light LEDs can be used at the lamps 5a, 5b.

The stereo camera 6 is installed in the vicinity of the room mirror and the like of the vehicle interior, and it acquires monitored information related to the road conditions and obstacles at the vehicle's front. This stereo camera 6 has a main camera 6a which is a near-infrared ray responsive camera, and a sub-camera 6b. The cameras 6a, 6b each have built into them, image sensors such as CCD sensors or CMOS sensors and the like, and are exposed to visible light and the reflected light from the near infrared rays projected to the front from the near-infrared lamps 5a, 5b and the headlights 4a, 4b.

The main camera 6a is arranged at the right side of the advancing direction, and photographs the basis image for the time of the stereo image processing. On the other hand, the sub-camera 6b is arranged at the left side of the advancing direction, and synchronized with the main camera 6a, photographs the comparison image (corresponding to the basis image). The analog signal outputted from the main camera 6a is, via an A/D converter 7a, converted to digital data at a fixed brightness level (for example, 256 levels of the gray scale).

This digital data is supplied to the correction processing unit 8, as the basis image data. Similarly, the analog signal outputted from the sub-camera 7b is, via an A/D converter 7b, changed to digital data and then, supplied to the correction processing unit 8, as the comparison image data.

The correction processing unit 8 performs, with regard to the basis image data and the comparison image data, image corrections such as correcting the brightness degree or geometrical transformations of the images. Usually, at the acquisition location of cameras 6a, 6b, due to the existence of errors caused by the distortions, etc. from bodies, gaps are produced in the photographed images, as well. Geometric transformations of affine transformations and the like are done in order to correct such gaps.

After having passed through such image processing, the basis image data and the comparison image data of 1 frame's share is outputted to a stereo image processing unit 9 of a later stage and attendantly, are saved in an image data memory 10.

The stereo image processing unit 9 calculates distance data based on the basis image and the comparison image. This distance data is a collection of parallax errors, calculated for each small area (a picture element block of a fixed size) of the image plane, which is regulated by the basis image data.

When calculating the parallax errors of one picture element area (a point of correlation) of the basis image, an area (origin of correlation) having the brightness characteristics of and the correlation with this picture element area is specified at the comparison image.

As is generally known, the distance from the stereo camera 6 to the target object appears as the horizontal direction gap amount between the basis image and the comparison image. Therefore, when searching for the origin of correlation at the comparison image, it is preferable to search along the horizontal line (epipolar line) corresponding to the picture element area that is the point of correlation.

Additionally, the correlation of the 2 image areas can be evaluated through, for example, calculating city block distances, and the picture element area for when that value is smallest is determined to be the point of correlation. The gap amount between the so specified point of correlation and origin of correlation becomes the parallax error.

The distance data calculated by going through this manner of processing, that is, the collection of parallax errors associated with positions at the image plane, are saved in the distance data memory 11. Because each of the parallax errors is associated with positions at the image plane, the distance data configured from a parallax error group equivalent to 1 frame is called the distance image.

The microcomputer 20 has a CPU, a RAM, a ROM, an input-output interface and the like. Through its executing a program(s), target objects existing at the vehicle's front (for example, a preceding vehicle or a pedestrian, etc.) are recognized, and their movements are observed. This recognition and the observation are done while referring to the image data saved at the image data memory 10, based on the distance data saved at the distance data memory 11, or in accordance with necessity.

The movements of the recognized target object, monitored information for the distance to the automotive vehicle, etc., and other information that should be transmitted to the driver (driving support information), is communicated in real-time from the microcomputer 20 to the display device of the heads-up display and the like, and outputted. As examples of such driving support information, there are alerts for the distance between cars, obstacle information, and traffic lane deviation alerts. The display at the heads-up display includes an indication of an image converted from a basis image (or a comparison image) while matching night characteristics, zoomed images of target objects such as pedestrians, highlighted display images, and so on.

In addition, the microcomputer 20, based on the monitoring information of the objects based on the distance data, controls the vehicle's travel motion via another control device, which respectively controls the brakes, the automatic transmission, the engine, the steering, etc. Each control unit comprises a microcomputer, a control program, etc., and as examples of travel motion control, there are cruise controls responsive to the distance between cars, obstacle avoidance control, and traffic lane maintenance control. The microcomputer 20 can also perform the control, just before a crash, of seat belts or airbags.

In the present embodiment, relating to the identification of objects by the microcomputer 20, the program carried out at this point includes, functionally, a road recognition unit 21, an object recognition unit 22, and a pedestrian identification unit 23, to be shown next. The road recognition unit 21 recognizes the lanes made on the road or guardrails provided at the roadside, based on the distance data and the image data (in any case, one or the other of the basis image or the comparison image). In other words, at the road recognition unit 21, locations of the road in 3-dimensional space, with the automotive vehicle as the center, are recognized.

The object recognition unit 22 similarly recognizes based on the distance data and the image data, in 3-dimensional space, objects (particularly, solid objects) in the road vicinity at the front of the automotive vehicle. That is, it recognizes the object's position in the sideways direction, the distance to it and its size.

Additionally, the object recognition unit 22 judges the sameness of an object within the photographed image at the nth frame (or a distance image configured from the distance data), with the object within the photographed image at the (n−1)th frame, and it performs a timed tracking. For this tracking, one can use correlations of the brightness between the objects within the 2 photographed images, or forecasts of the movement positions of the objects, etc.

The pedestrian identification unit 23 performs a kernel discriminant analysis based on parallax error (distance images, data regarding the images of the object). According to this kernel discriminant analysis, it is identified whether the object recognized at the object recognition unit 22 is a pedestrian or not.

This pedestrian identification unit 23 has, in further detail to be shown next, a precondition judgment unit 23a, an input feature vector generation unit 23b, a kernel discriminant analysis operations unit 23c, and an object determination unit 23d, to be shown next. The precondition judgment unit 23a, based on the distance, size, etc. of the object detected by the object recognition unit 22, judges whether or not to execute the identification of a pedestrian, through kernel discriminant analysis regarding the object. If the object satisfies the preconditions (the object satisfies the preconditions for performing the operations for use in kernel discriminant analysis), the processing at the input feature vector generation unit 23b is done.

If the object does not satisfy the preconditions, the operations relating to kernel discriminant analysis are not performed, and the object is judged not to be a pedestrian at the object determination unit 23d. For example, the precondition judgment unit 23a judges as not being a pedestrian, an object that is clearly larger than a pedestrian.

The input feature vector generation unit 23b generates input vector u based on parallax error, calculated regarding an object (an area of a distance image corresponding to the object) that satisfies the preconditions. This input feature vector u includes, as its elements, the object's size, the object's upper portion shape and side portion shape. Its arrangement is peculiar to this stereo image processing equipment 1. This configuration of the input feature vector u will be explained below, using FIGS. 3-6.

The kernel discriminant analysis operations unit 23c through performing the operations for kernel discriminant analysis based on the generated input feature vector u, generates a vector y, which is mapped to the discriminant space. In other words, the kernel discriminant analysis operations unit 23c substitutes the input feature vector u and training data di, which were recorded beforehand, into the following numerical formula 1. Consequently, a kernel feature vector x(u) at the kernel feature space is generated.

The input feature vector is generated regarding an object within the image, as will be shown in the following, and the training vector $d_i$ is a vector having elements arranged following the same rules as for the input feature vector u. N is the total number of the training data di. The collection consisting of this N number of training data di includes a pattern where the object is a pedestrian and a pattern where the object is other than a pedestrian. The pattern for a pedestrian is extracted beforehand from an image of a pedestrian. Also, the pattern for other than a pedestrian is extracted from an image of other than a pedestrian. $|u-d_i|$ is the distance between the input features vector u and the i-th training data (vector) $d_i$, and σ is a parameter.

When the value of parameter σ is small, a kernel feature vector x(u) is generated, consisting of localized information where the distance to the input feature vector u is close. Additionally, when the value of parameter σ is large, a kernel feature vector x(u) is generated, consisting of information with a wide range, where the distance to the input vector u is spaced apart. By setting this σ properly, it becomes possible to obtain a discriminant space having a strong discriminant power (as described later).

Furthermore, the kernel feature vector x(u) generated in this manner is a vector having the total training data number N elements. By having generated the training data $d_i$ from images of a pedestrian's front, back and side planes, it becomes possible to discern various aspects of the pedestrian.

$$x(u) = \exp\left(-\frac{|u-d_i|^2}{2\sigma^2}\right) \quad (i=1, 2, \ldots, N) \qquad \text{[Equation 1]}$$

Next, the kernel discriminant analysis operations unit 23c generates vector y, mapped to the discriminant space, through substituting a fixed matrix A, which relates to the generated kernel feature vector x(u) and the training data di, into the following numerical formula 2. This matrix A, as shown using the following numerical formulas 3-17, is established and stored beforehand, per the training data set for the pedestrian class (a collection of training data for when the object is a pedestrian, at the input feature vector u) and per the training data set for a non-pedestrian class. The discriminant space is arranged with an eigenvector of this matrix A as a base.

$$y = A^T \cdot x(u) \qquad \text{[Equation 2]}$$

The object discriminant unit 23d distinguishes whether the object corresponding to this vector y is a pedestrian or not, according to whether or not the vector y mapped to the discriminant space is within a fixed space specified beforehand, of the discriminant space.

Whether the object is a pedestrian or not is identified at the pedestrian identification unit 23 in the above manner. One will now explain regarding the calculation method of the above-described matrix A. As mentioned above, this matrix A is established from the training data set of the pedestrian class and from the training data set of the non-pedestrian class.

First, the training data set C of the pedestrian class, and the training data set /C of the non-pedestrian class are, respectively, expressed as in the following numerical formulas 3, 4, using the kernel feature vector x.

$$C = \{x_i | i=1, 2, \ldots n_f\} \qquad \text{[Equation 3]}$$

$$\overline{C} = \{x^k | k=1, 2, \ldots n_{\overline{f}}\} \qquad \text{[Equation 4]}$$

Here, nf is the number of images of pedestrians within the entire training data numbering N, and n/f is the number of images of non-pedestrians. At this point, the mean /$k_f$ of the pedestrian class, and the variance-covariance matrix $\Sigma_f$ are respectively as in numerical formulas 5, 6.

$$\overline{k}_f = \frac{1}{n_f} \sum_{i=1}^{n_f} x_i \qquad \text{[Equation 5]}$$

$$\sum_f = \frac{1}{n_f} \sum_{i=1}^{n_f} (x_i - \overline{k}_f)(x_i - \overline{k}_f)^T \qquad \text{[Equation 6]}$$

Furthermore, the mean vector /k/f of the non-pedestrian class, and the overall mean vector /k_T, are respectively as in numerical formulas 7,8.

$$\overline{k}_{\overline{f}} = \frac{1}{n_{\overline{f}}} \sum_{k=1}^{n_{\overline{f}}} x^k \qquad \text{[Equation 7]}$$

$$\overline{k}_T = \omega_f \overline{k}_f + \frac{1}{N} \sum_{k=1}^{n_{\overline{f}}} x^k \qquad \text{[Equation 8]}$$

Here, the entire training data numbering N, the foresight probability ωf of the pedestrian class, and the foresight probability ω/f of the non-pedestrian class are respectively as in numerical formulas 9, 10, 11.

$$N = n_f + n_{\overline{f}} \qquad \text{[Equation 9]}$$

$$\omega_f = \frac{n_f}{N} \qquad \text{[Equation 10]}$$

$$\omega_{\overline{f}} = \frac{n_{\overline{f}}}{N} \qquad \text{[Equation 11]}$$

From these, the mean class internal variance-covariance matrix $\Sigma^{(f)}_W$, and the covariance matrix $\Sigma^{(f)}_B$ between mean classes, are respectively as in numerical formulas 12, 13.

$$\sum_W^{(f)} = \omega_f \sum_f \qquad \text{[Equation 12]}$$

$$\sum_W^{(f)} = \qquad \text{[Equation 13]}$$

$$\omega_f (\overline{k}_f - \overline{k}_T)(\overline{k}_f - \overline{k}_T)^T + \frac{1}{N} \sum_{k=1}^{n_{\overline{f}}} (x^k - \overline{k}_T)(x^k - \overline{k}_T)^T$$

In order to obtain a discriminant space having a stronger discriminant power, it is desirable to minimize the class internal covariance at the discriminant space, and also to maximize the covariance between classes. Such a discriminant space with a strong discriminant power is obtained through making a condition of absolutely maximizing the discriminant criteria J of numerical formula 14.

The matrix shown in numerical formula 15, at the right hand area of numerical formula 14, is the class internal covariance matrix of the discriminant space. The matrix shown in numerical formula 16, at the right hand area of numerical formula 14, is the covariance matrix between classes of the discriminant space. The matrix A most suitable to the absolute maximizing of the discriminant criteria J is sought through solving the eigenvalue problem of numerical formula 17. Here, A is a diagonal matrix consisting of the eigenvalues, and I is the identity matrix.

$$J = tr\left(\hat{\sum}_W^{(f)^{-1}} \hat{\sum}_B^{(f)}\right) \qquad \text{[Equation 14]}$$

$$\hat{\sum}_W^{(f)} = A^T \sum_W^{(f)} A \qquad \text{[Equation 15]}$$

$$\hat{\sum}_B^{(f)} = A^T \sum_B^{(f)} A \qquad \text{[Equation 16]}$$

$$\sum_B^{(f)} A = \sum_W^{(f)} A\Lambda \quad \left(A^T \sum_W^{(f)} A = I\right) \qquad \text{[Equation 17]}$$

In the above manner, the matrix A is pursued from the training data set C of the pedestrian class and from the training data set /C of the non-pedestrian class. Through this matrix A, the kernel feature vector x(u) is mapped to a discriminant space having a strong discriminant power regarding the pedestrian class and the non-pedestrian class. Also, if all of the training data $d_i$ is mapped to this discriminant space based on matrix A, one can confirm that vectors belonging to the pedestrian class are gathered as much as possible, and that vectors belonging to the non-pedestrian class are separated as much as possible from the center of gravity of the pedestrian class.

Figure 2:
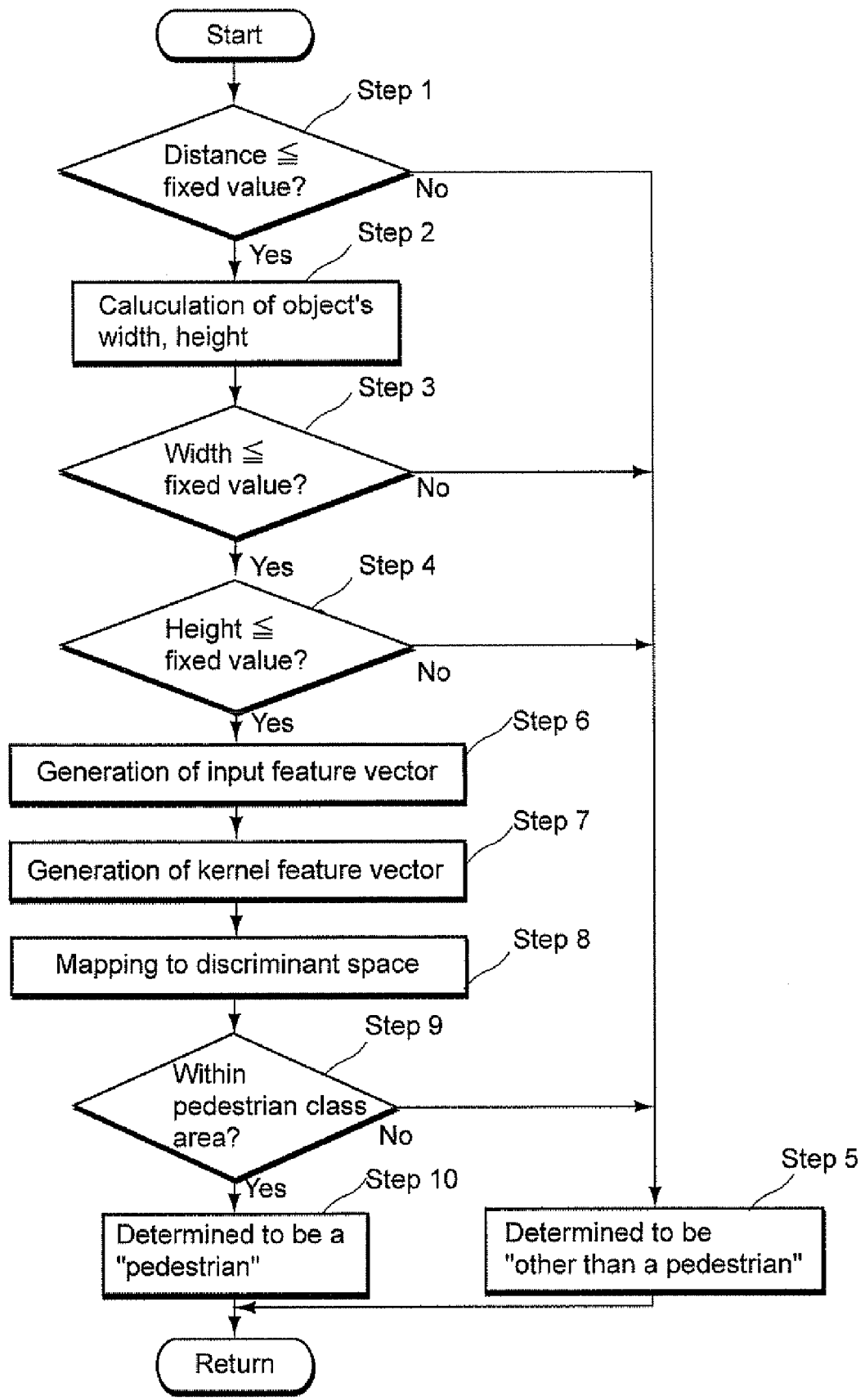
FIG. 2 is a flowchart showing a process for pedestrian identification handling.

FIG. 2 is a flowchart showing the detailed procedures of the pedestrian identification processing relating to the present embodiment. With this pedestrian identification processing, whether a detected object is a pedestrian or not is identified based on kernel discriminant analysis, as described above.

At Steps 1-4 of the pedestrian identification processing, it is judged whether or not the preconditions for executing the pedestrian identification via kernel discriminant analysis at the latter steps (steps 6-9), regarding a detected object (solid object) have been satisfied. These preconditions are established in plurality, and steps 6-9 are not carried out for objects for which any of the preconditions are not satisfied via the judgments at steps 1,3,4. Because of this, for objects that do not satisfy such preconditions, it is possible to perform a rapidly accurate discrimination that it is not a pedestrian.

Additionally, due to performing the judgments regarding the preconditions at this point, it becomes unnecessary to include data for objects larger than pedestrians within the training data di. Thus, it is possible to suppress processing times and memory consumptions to a minimum.

At Step 1, it is judged whether or not the distance from the automotive vehicle to an object is below a fixed value. With the present pedestrian identification processing, whether this object is a pedestrian or not is determined by the objects shape based on parallax error. According to the properties of cameras 6a, 6b, the longest distance for taking advantage of the object's shape based on parallax error, is determined. The fixed value of Step 1 is established according to this best distance. By means of this judgment at Step 1, only objects within this best distance are targeted for pedestrian identification processing.

If a negative determination is made at Step 1, that is, if the distance to the object is greater than the fixed value, Steps 2-9 are not carried out. One proceeds to Step 5, determines the detected object to be a "non-pedestrian", and leaves the present routine. If an affirmative determination is made at Step 1, that is, if the distance to the object is less than or equal to the fixed value, one proceeds to Step 2.

At Steps 2-4, it is determined whether or not the actual size of the detected object can possibly be a pedestrian. If this object is larger than a fixed value established as the size of a pedestrian, Steps 6-9 are not carried out, and this object is distinguished as a "non-pedestrian".

First, at Step 2, the width of the object's absolute size (the absolute size length of the object in a horizontal direction), and its absolute size height (the absolute size length of the object in a vertical direction), are calculated, based on a pinhole camera model, through the area of photographing of the object, and the distance to the object. In other words, the absolute size width W[cm] and the absolute size height H[cm] are sought through the numerical formulas 18, 19, shown as follows.

$$W = d_i \cdot \frac{CAM_{Wi}}{CAM_F} \cdot zcg \quad \text{[Equation 18]}$$

$$H = d_j \cdot \frac{CAM_{Wj}}{CAM_F} \cdot zcg \quad \text{[Equation 19]}$$

Here $d_i$[pix], $d_j$[pix], zcg[cm] show, respectively, the object's width at the image, the object's height at the image, and the distance between the object and the automotive vehicle. These have already been sought at the object recognition unit 22, based on parallax error. Also, $CAM_{Wi}$[cm/pix], $CAM_{Wj}$[cmpix], $CAM_F$[cm] are constants from the properties of the camera and are, respectively, the image photographed element size in the width direction (here, the horizontal direction), the image photographed element size in the height direction (the vertical direction), and the focal distance.

At Steps 3, 4, it is determined whether or not the absolute size width W and the absolute size height H sought at Step 2 are, respectively, less than or equal to the individually set fixed values. If a negative determination is made at Step 3, that is, the object's absolute size width W is larger than the fixed value, then Steps 6-9 are not carried out. One distinguishes the object as "non-pedestrian" at Step 5, and leaves the present routine. If a negative determination is made at Step 4, and the object's absolute size height H is larger than the fixed value, one similarly distinguishes the object as "non-pedestrian", and leaves the present routine.

Furthermore, if an affirmative determination is made at Step 3 and also an affirmative determination is made at Step 4, that is, the absolute size width W is less than or equal to the fixed value and the absolute size height H is less than or equal to the fixed value, then one proceeds to Step 6.

Still further, the fixed value is considered the size of a pedestrian. Thus, the width and the height values are set as, for example, on the order of 1-2 m. However, regarding the height, it can be set at 2 m or less, without setting a minimum value.

Figure 3:
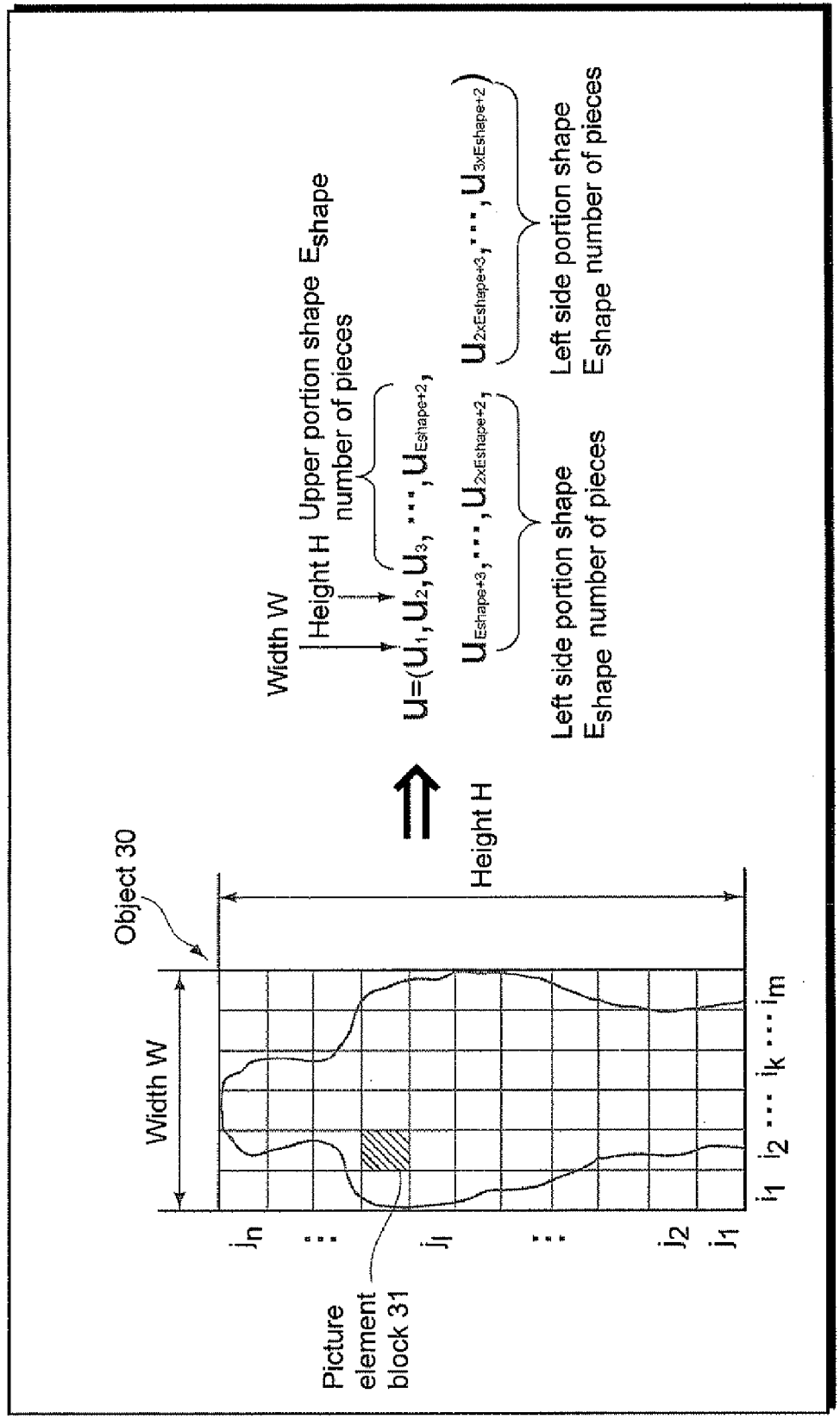
FIG. 3 is a configuration drawing of the input feature vector, generated at Step 6 of the pedestrian identification handling.

At Step 6, an input feature vector u is generated, based on the parallax error relating to the object 30. FIG. 3 is a drawing showing the configuration of the input feature vector u.

This input feature vector u is normalized as described below, and has elements of ENUM number of pieces. As these elements, a numerical value expressing the size of the object 30, a numerical value expressing the upper portion shape of the object 30, and a numerical value expressing the side portion shape of the object 30 are included.

This upper portion shape of the object 30 can be characterized by representative values of the object's length in the vertical direction, from the bottom edge of an area of the object 30 to the top end of the object 30, for the respective sections from dividing, at a fixed width, the image photographed area (rectangular) of the object 30 in the horizontal direction.

Additionally, the side portion shape of the object 30 can be assumed to be from the left side shape of the object 30 and the right side shape of the object 30. The left side shape of this object 30 can be characterized by representative values of the object's length in the horizontal direction, from the rightmost edge of an area of the object 30 to the leftmost edge of the object 30, for the respective sections from dividing, at a fixed width, the image photographed area of the object 30 in the vertical direction. The right side shape of the object 30 can be characterized by representative values of the object's length in the horizontal direction, from the leftmost edge of an area of the object 30 to the rightmost edge of the object 30, for the respective sections from dividing, at a fixed width, the image photographed area of the object 30 in the vertical direction.

The width of these sections in the horizontal direction and the width of these sections in the vertical direction can be the same, or they can be different.

More concretely, one can make the absolute size width W[cm] calculated at Step 2 to be the first element of the input feature vector u, and the absolute size height H[cm] of the object 30 to be the second element. In addition, as described above, at the basis image, each picture element block 31 (of 4×4, for example) can be corresponded with the parallax error, at the stereo image processing unit 9.

The distance image consists of this parallax error group within 1 frame. The object 30 is recognized as a rectangular area surrounding the object 30 within the distance image. Within this area, the distance to the object 30 and the distance to the background differ. Thus, the shape of the object 30 can be specified based on the difference between the parallax error regarding the object 30 and the parallax error regarding the background. In short, the smallest image areas obtained from dividing the image in the horizontal and vertical directions, as described above, can be corresponded to the picture element blocks which have been corresponded to the parallax errors (from which the distance image is composed).

Within the same figure, the area corresponding to the object 30 in the distance image has a length in the width direction of m blocks, for No. $i_1$ block, No. $i_2$ block, ..., No. $i_m$ block. It also has a length in the height direction of n blocks, for No. $j_1$ block, No. $j_2$ block, ..., No. $j_n$ block. In the width direction for each block position $i_k$ (k=1,2, ..., m), it is possible to specify the length in the height direction of the object 30. In the height direction for each block position $i_l$ (l=1,2, ..., n), it is possible to specify the length in the width direction of the object 30.

Regarding the elements of the input feature vector u, here, the numerical value of m number of pieces that express the upper portion shape is normalized to $E_{shape}$ number of pieces, and the elements correspond to the elements of the No. 3 to No. ($E_{shape}$+2), ($E_{shape}$) number of pieces of the input feature vector u. Each element's value is the numerical value when each representative value expressing the upper portion shape is normalized regarding the absolute size height of the object 30, for each section after normalization of the ($E_{shape}$) number of pieces, and the values of 0 to $MAX_{nor}$ are taken.

Additionally, the numerical value of n number of pieces that express the left side shape is normalized to $E_{shape}$ number of pieces in the height direction, and the elements correspond to the elements of the No. ($E_{shape}$+3) to No. (2×$E_{shape}$+2), ($E_{shape}$) number of pieces of the input feature vector u. Each element's value is the numerical value when each representative value expressing the left side shape is normalized regarding the absolute size width of the object 30, for each section after normalization of the ($E_{shape}$) number of pieces. and the values of 0 to $MAX_{nor}$ are taken.

Similarly, the numerical value of n number of pieces that express the right side shape is normalized to $E_{shape}$ number of pieces in the height direction, and the elements correspond to the elements of the No. ($2 \times E_{shape}+3$) to No. ($3 \times E_{shape}+2$), ($E_{shape}$) number of pieces of the input feature vector u. Each element's value is the numerical value of 0 to $MAX_{nor}$, expressing the right side shape after normalization regarding the absolute size width of the object 30.

For example, if the $E_{shape}$ is made to be 10 pieces, the entire element number ENUM of the input feature vector u becomes 32 pieces.

In addition, if the $MAX_{nor}$ is made to be 255, one can deal with the absolute size width W[cm] and the absolute size height H[cm] to 255 cm, and the pedestrian's actual size and its shape can be expressed with the same value. Furthermore, due to making this value an integer value of from 0-255, the speeding up of the operations can be devised.

Here, the number of elements obtained from normalization is made to be equal for the $E_{shape}$ number, the upper portion shape, the left side shape and the right side shape. However, these element counts can, of course, also be different.

Figure 4:
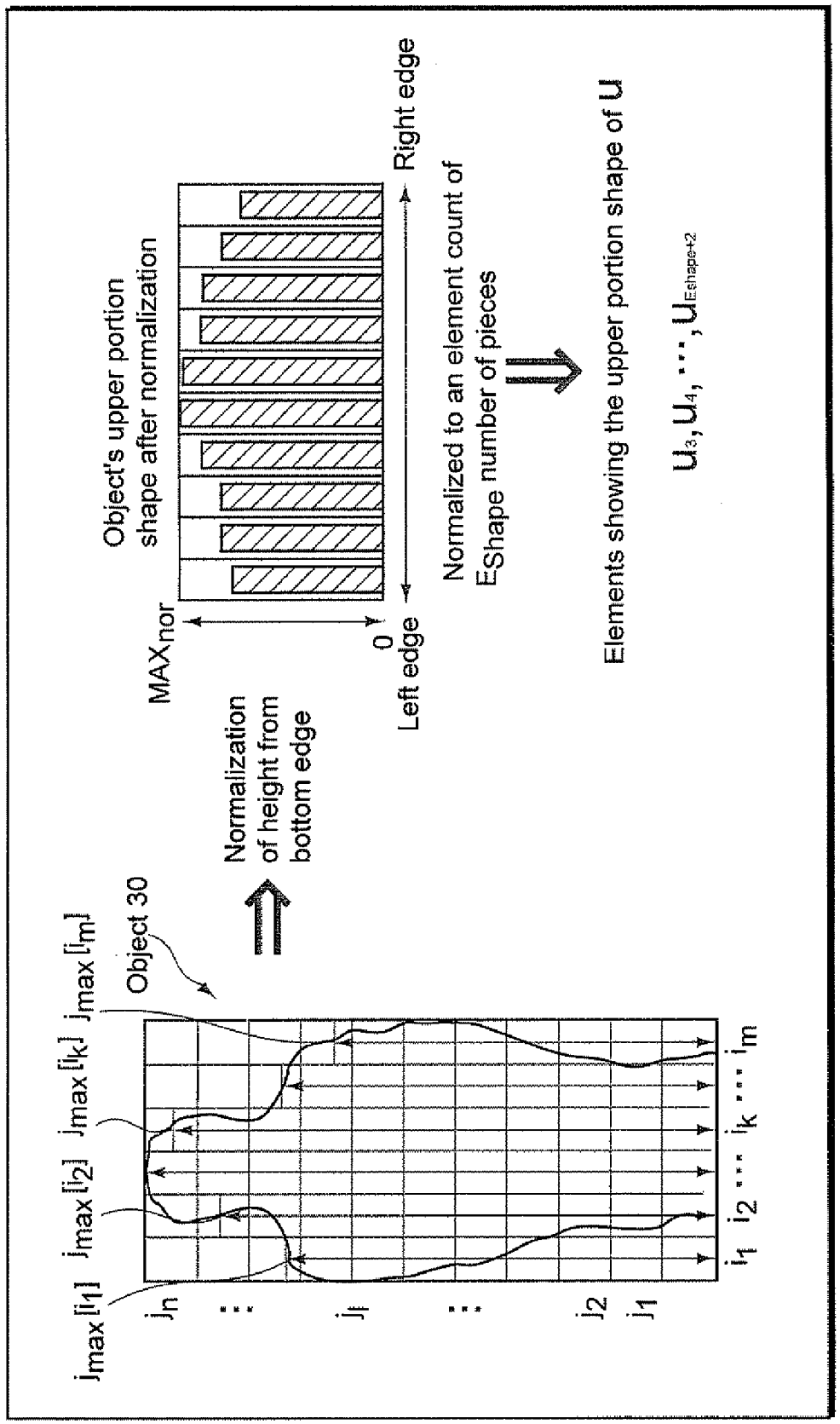
FIG. 4 is an explanatory drawing of the generation of elements related to the upper portion shape of the input feature vector.

FIG. 4 is a drawing to explain the generation of elements relating to the upper portion shape, for the input feature vector u. The numerical value of m number, expressing the upper portion shape of the object 30, is normalized for height in the vertical direction. And also, the piece number of those sections is normalized to be the above-described $E_{shape}$ number of pieces.

For the object 30, block No. $i_k$ ($k=1,2,\ldots,m$) has a length of The $j_{max}[i_k]$ share, from the bottom edge of the area corresponding to the object 30, to the top edge within this area (having the background near the top edge taken away), in the vertical direction. In other words, object 30 has a length of $j_{max}[i_1]$ block's share, $j_{max}[i_2]$ block's share, ..., $j_{max}[i_m]$ block's share, at each location of the No. $i_1$ block, No. $i_2$ block, ..., No. $i_m$ block which are lined up in the width direction.

The numerical values $j_{max}[i_k]$ that express the upper portion shape of this object 30 are normalized in the following way, and they become the elements for the No. 3 to the No. ($E_{shape}+2$), ($E_{shape}$) number of pieces, for the input feature vector u.

For the object 30 recognized at the object recognition unit 22, first the $i_k$ which is employed to normalize the width direction's block count m pieces into the element count $E_{shape}$ number of pieces, is calculated via numerical formula 20.

$$i_{nor} = int\left[i \cdot \frac{m}{E_{shape}}\right] \quad (i = 1, 2, \ldots, E_{shape}) \quad \text{[Equation 20]}$$

The int[ ] is a calculation for getting the integer portion of the numerical value within the [ ]. With numerical formula 20, i is increased successively by 1, from 1 to $E_{shape}$ and renewed, while $i_{nor}$ is calculated regarding each i. The calculated $i_{nor}$ is the $i_k$, employed in normalizing the numerical value that expresses the upper portion shape, from the m piece to the $E_{shape}$ piece.

Furthermore, the block number $j_{max}[i_{nor}]$ for the object 30 in the height direction, for No. $i_{nor}$ block, is substituted into the following numerical formula 21, and a numerical value is normalized in the height direction that expresses the upper portion shape of the object 30.

$$j_{max\_nor}[i] = int\left[\frac{Max_{nor}}{n} \cdot j_{max}[i_{nor}]\right] \quad \text{[Equation 21]}$$

Here, n is the block count in the height direction of the object. By means of this numerical formula 21, a ratio for each value of $j_{max}[i_{nor}]$ is normalized to an integer value within the range of 0-$MAX_{nor}$, and the value after this normalization is stored in $j_{max\_nor}[i]$. This $j_{max\_nor}[i]$ is arranged to be the No. 3 to the No. ($E_{shape}+2$) elements of the input feature vector u. Here, each element arranged from the left to the right within the input feature vector u, sequentially corresponds to from the left side to the right side of the upper portion shape of the object 30.

Figure 5:
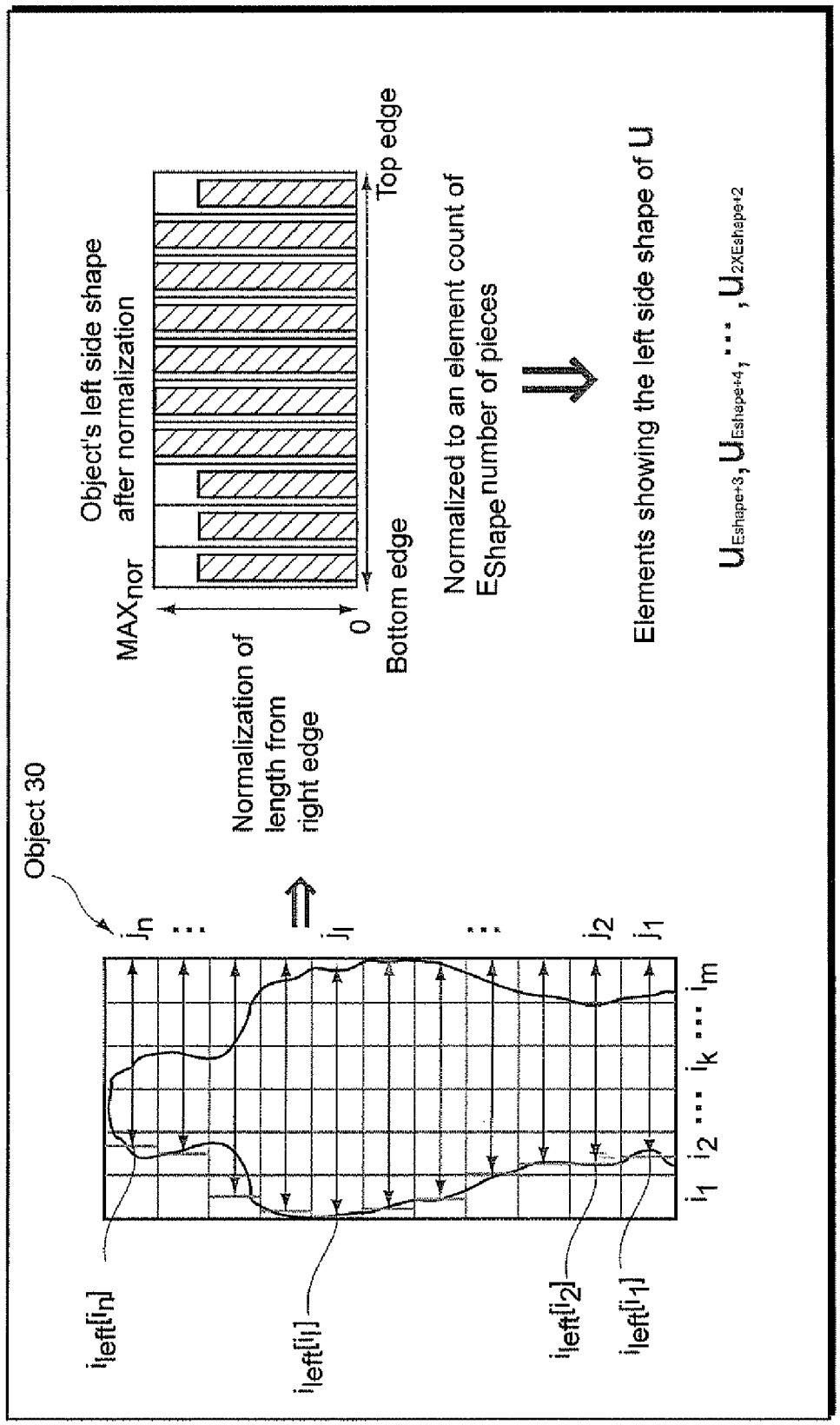
FIG. 5 is an explanatory drawing of the generation of elements related to the left side shape of the input feature vector.

FIG. 5 is a drawing to explain the generation of elements relating to the left side shape, for the input feature vector u. The numerical value of n number of pieces, showing the left side shape of the object 30 is normalized for the width, and normalized so that the piece number of those sections become the above-described $E_{shape}$ number.

For the object 30, block No. $j_l$ ($l=1,2,\ldots,m$) has a length of the $i_{left}[j_l]$ share, from the right edge of the area corresponding to the object 30, to the left edge of the object 30 within this area, in the width direction. In other words, object 30 has a length of $i_{left}[j_1]$ block's share, $i_{left}[j_2]$ block's share, ..., $i_{left}[j_n]$ block's share, at each location of the No. $i_1$ block, No. $i_2$ block, ..., No. $j_n$ block in the height direction.

The numerical values that express the left side shape of this object 30 are normalized as follows, similarly to the above-described numerical values expressing the upper portion shape, and they become the elements for the No. ($E_{shape}+3$) to the No. ($2 \times E_{shape}+2$), ($E_{shape}$) number of pieces, for the input feature vector u.

For the object 30, first the $j_1$ which is employed to normalize the height direction's block count n number of pieces into the element count $E_{shape}$ number of pieces, is calculated via numerical formula 22.

$$j_{nor\_side} = int\left[j \cdot \frac{n}{E_{shape}}\right] \quad (j = 1, 2, \ldots, E_{shape}) \quad \text{[Equation 22]}$$

With numerical formula 22, as well, j is increased successively by 1, from 1 to $E_{shape}$ and renewed, while $j_{nor\_side}$ is calculated regarding each j. That is, the $j_1$ to be employed is calculated. Furthermore, the block number $i_{left}[j_{nor\_side}]$ towards the left side of the object 30, for the No. $j_{nor\_side}$ block, is substituted into the following numerical formula 23, and a numerical value is normalized in the width direction that expresses the left side shape of the object 30.

$$i_{max\_nor\_left}[j] = int\left[\frac{MAX_{nor}}{m} \cdot i_{left}[j_{nor\_side}]\right] \quad \text{[Equation 23]}$$

Here, m is the block count in the width direction of the object. By means of this numerical formula 23, a ratio for each value of $i_{left}[j_{nor\_side}]$ is normalized to an integer value within the range of 0-$MAX_{nor}$, and that value is stored in $i_{max\_nor\_left}[j]$. This $i_{max\_nor\_left}[j]$ is arranged to be the No. [$E_{shape}+3$] to the No. ($2 \times E_{shape}+2$) elements of the input feature vector u. Here, each element arranged from the left to the right sequentially corresponds to from the bottom side to the top side of the left side shape of the object 30.

Figure 6:
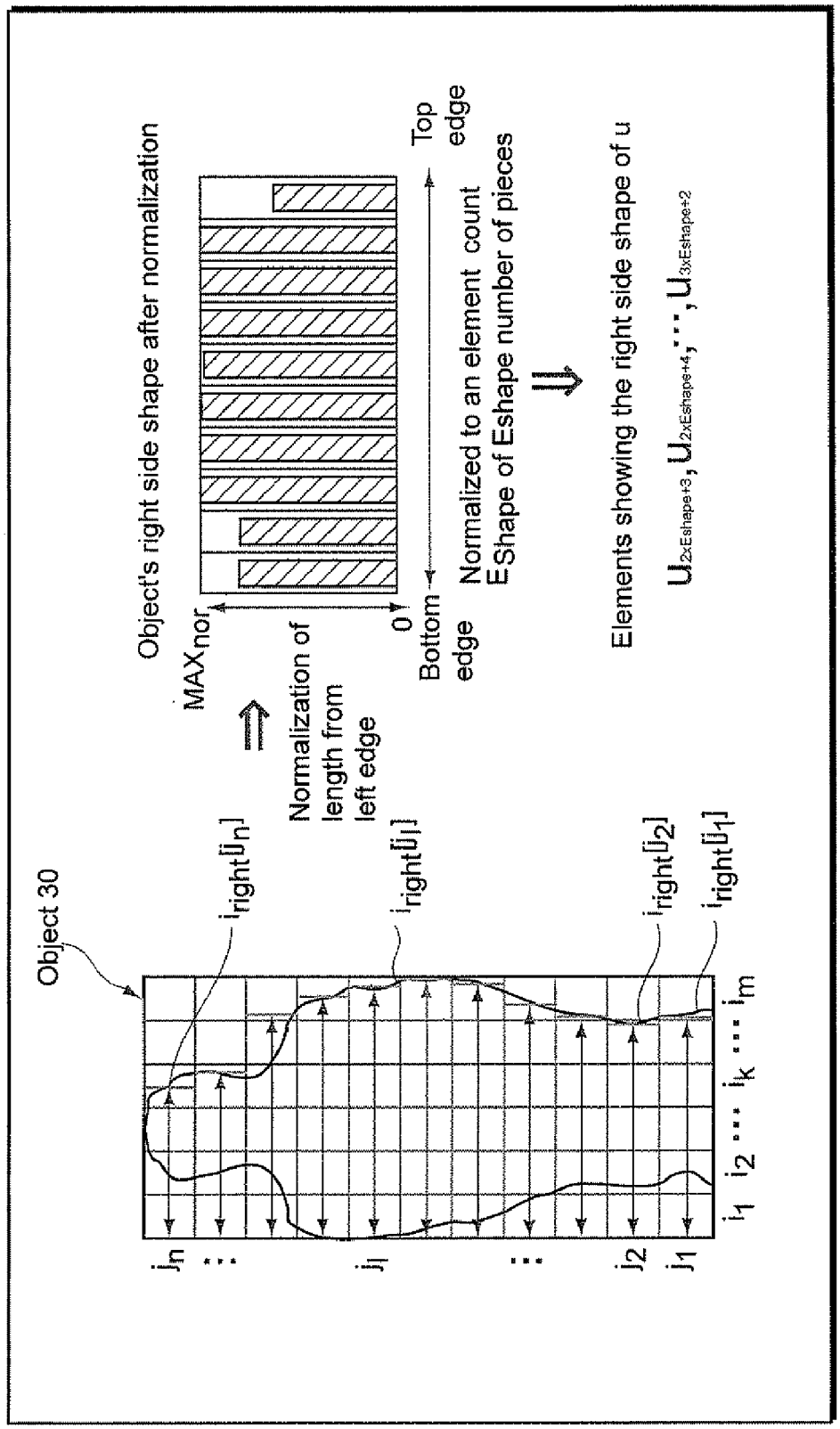
FIG. 6 is an explanatory drawing of the generation of elements related to the right side shape of the input feature vector.

FIG. 6 is a drawing to explain the generation of elements relating to the right side shape, for the input feature vector u. The numerical value of n number of pieces, expressing the right side shape of the object 30, is normalized for width in the horizontal direction. And also, the piece number of those sections is normalized to be the above-described $E_{shape}$ number of pieces. In other words, for the object 30, block No. $j_1$ (l=1,2, ..., n) has a length of the $i_{right}[j_1]$ share, from the left edge of the area corresponding to the object 30, to right edge of the object 30 within this area, in the width direction.

The numerical values that express the right side shape of this object 30 are normalized as follows, similarly to the above-described numerical values expressing the left side shape, and they become the elements for the No. $(2 \times E_{shape}+3)$ to the No. $(3 \times E_{shape}+2)$, $(E_{shape})$ number of pieces, for the input feature vector u.

Here, one presupposes that in order to extract the right side shape of the object 30, the sections dividing the area corresponding to the object 30 are the same as the sections dividing the area corresponding to the object 30 in order to extract the left side shape, and that the element counts after normalization are also the same. For this reason, the $j_{nor\_side}$ calculated via the above-described numerical formula 22 is identical to the $j_1$ employed here for the object 30, for normalizing the height direction block count n pieces to the element count $E_{shape}$ number of pieces.

The block number $i_{right}[j_{nor\_side}]$ towards the right side of the object 30, for this No. $j_{nor\_side}$ block, is substituted into the following numerical formula 24, and through this, a normalization is performed in the width direction for a numerical value that expresses the right side shape of the object 30.

$$i_{max\_nor\_right}[j] = int\left[\frac{MAX_{nor}}{m} \cdot i_{right}[j_{nor\_side}]\right] \quad \text{[Equation 24]}$$

That is, by means of this numerical formula 24, a ratio for each value of $i_{right}[j_{nor\_side}]$ is normalized to an integer value within the range of 0-$MAX_{nor}$ and that value is stored in $i_{max\_nor\_right}[j]$. This $i_{max\_nor\_right}[b]$ is arranged to be the No. $[2 \times E_{shape}+3]$ to the No. $(3 \times E_{shape}+2)$ elements of the input feature vector u.

Here, each element arranged from the left to the right sequentially corresponds to from the bottom side to the top side of the right side shape of the object 30, similarly to the above-described each value after normalization for expressing the left side shape.

In particular, here the upper portion shape, left side shape and right side shape of the input feature vector u have been specified in block units (corresponded to parallax errors). Differently from this, considering that an object separated at a distance appears small in an image, it may also be desirable to specify in picture element units, according to the requirements of the shape of the object, and perform the above-mentioned similar processing.

Also, in order to perform extractions of shapes with further stability, one can apply, for example, media filter processing or a processing for taking a moving average, to the input feature vector u.

At Step 7 of FIG. 2, the kernel feature vector x(u) is generated through the above-mentioned numerical formula 1, based on the input feature vector u generated at Step 6 and the stored training data $d_i$. This calculation is done for all of the training data, and the kernel feature vector $x(u)=(x_1, x_2, ..., x_N)$ with the training data count N made to be the element count, is generated.

At Step 8, the kernel feature vector x(u) generated at Step 7 is mapped to the discriminant space through the above-mentioned numerical formula 2, and a vector y is generated at the discriminant space. This matrix A is, as described above, sought and stored beforehand, based on the training data set C of the above-mentioned numerical formula 3, as well as on the training data set /C of numerical formula 4.

At Step 9, one determines whether or not the vector y mapped to the discriminant space at Step 8, exists within a pedestrian class area established beforehand at the discriminant space. If an affirmative determination is made at Step 9, that is, if the vector y exists within the pedestrian class area, one proceeds to Step 10, and the object which caused the generation of vector y is determined to be a "pedestrian". After this, one leaves the present routine.

On the other hand, if a negative determination is made at Step 9, that is, vector y does not exist within the pedestrian class area, this object is determined to be a "nor-pedestrian" at Step 5, and after that, one leaves the present routine.

The pedestrian class area used for the determination at Step 9 is, after mapping the entire training data of the pedestrian to the discriminant space, established beforehand as the enclosed region area that includes all of these mapping vectors. For example, when making the discriminant space to be a 2 dimensional plane with a foundation of 2 eigenvectors that correspond with 2 of the greatest eigenvalues of matrix A, the boundary of the pedestrian class and the non-pedestrian class can be established as a 2 dimensional closed area.

All of the training data is mapped to within this closed area at the discriminant space. Whether or not the mapped vector y (its end point) is within this area is determined through substituting a numerical value in an equation that specifies this boundary (or area).

With the present embodiment, kernel discriminant analysis is done based on its special input feature vector u. And, based on this discriminant result, whether the object that caused the configuration of the input feature vector u, is a pedestrian or not is identified. Here, because the input feature vector u employs as its elements the object's size, the objects upper portion shape and the object's side portion shapes, the outline features of the object is perceived accurately at the data based on an image, and one can perform pedestrian identification rapidly.

In addition, by means of including patterns at the training data set that especially require identifications, the identification can be performed with high accuracy.

Still further, in the above-mentioned embodiment, one has explained a technique for identifying whether or not an object is a pedestrian, based on a stereo image (or the parallax error which is the data relating to this image). The present invention is not limited to applications to stereo images.

For example, images generated through laser radar, monocular cameras, etc. can be used. The object's outline can be extracted within these images (or data related to such images), an input feature vector can be generated for this object, and operations relating to kernel discriminant analysis can be done. In this manner, whether or not this object is a pedestrian can be identified.

Also, one has presupposed that kernel discriminant analysis is done at the kernel discriminant operations unit 23c and the like. Regarding this, a pattern discrimination device that performs processing which differs from kernel discriminant analysis can also be used.

With this discrimination device, a specific space is used and the feature vector is classified into 2 classes. In other words, an input feature vector that includes as elements the object's size, the object's upper portion shape, and the object's side portion shapes is generated, based on data relating to the image. Based on this input feature vector, a vector mapped to this specified space is generated. And then, according to whether or not the vector mapped to the specific space is within a fixed area at the space that regulates the identification boundaries, it is determined whether or not this object is a pedestrian. This identification boundary is set by means of a discriminant function using training data.

Even with such a discrimination device, one can obtain effects similar to those described above. For example, a support vector machine can be used as this discrimination device.

At the time of the kernel discriminant analysis, the kernel feature vector x(u) is calculated through the numerical formula 1. In substitution for a part or the entirety of this calculation, one can store a table beforehand with the calculation results, and interpolation operations can also be done from numerical values referenced from this table. Through this, the operations can be made even faster.

In addition, the object's absolute size width and the object's absolute size height were employed as the object's size, as an element of the input feature vector. However, it is possible to use only one of those, or to use the absolute size length of the object in a discretionary direction, to substitute for the lengthwise/crosswise.

Second Embodiment

Figure 7:
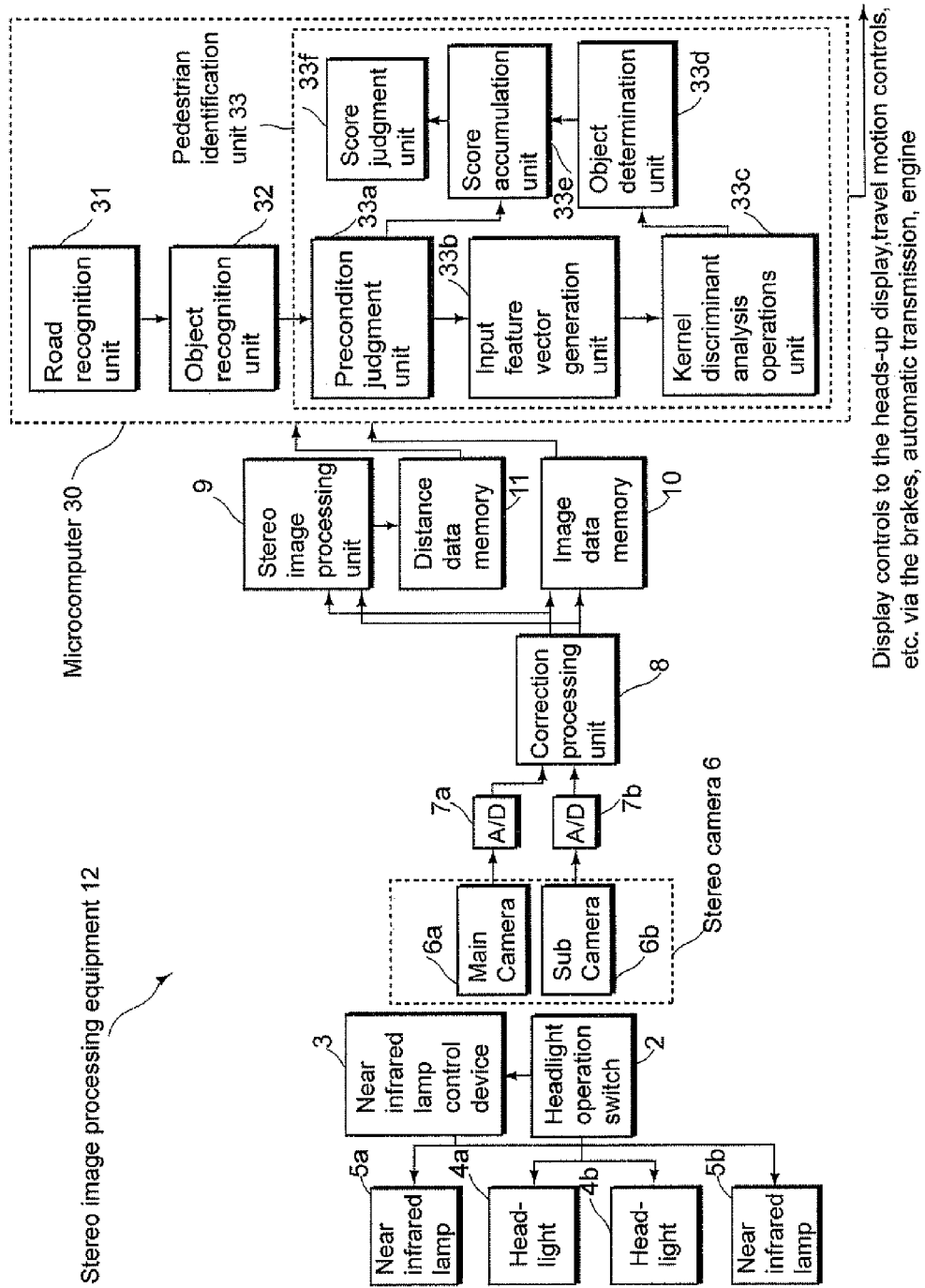
FIG. 7 is a block diagram showing a configuration of the stereo image processing equipment of a second embodiment.

FIG. 7 is a block diagram showing a main configuration of a stereo image processing unit 12, relating to a second embodiment. In this present embodiment, elements that are the same as configuration elements explained in the first embodiment have the same reference characters, and their explanations are omitted. When the probability that the same object within plural frames is a pedestrian (pedestrian likeness) becomes greater than a fixed value, one feature of the stereo image processing unit 12 is to judge that this object is a pedestrian.

In other words, in a the present embodiment, an accumulation is made of scores showing the resemblance to a pedestrian, within a plurality of frames, based on the tracking process within a frame relating to object detection and the identification results at the discriminant space. With this, the accuracy and certainty of pedestrian identification can be improved.

Regarding this point, in the first embodiment, one determined right away regarding an object within an image at 1 frame, whether it was a pedestrian or not. However, according to the particular distinctions between the 2 embodiments, the pedestrian identification unit 33 has a score accumulation unit 33e and a score judgment unit 33f. An object determination unit 33d discerns whether an object within an image at 1 frame is a pedestrian or not.

At the score accumulation unit 33e, fixed scores are arranged for expressing an object's appearing like a pedestrian. Whether to perform all of the score valuations and their adjustments varies depending on the discrimination results via the object determination unit 33d. The score accumulation unit 33e accumulates and keeps these scores, for an identical object appearing in a series of plural frames. A score judgment unit 33f determines whether this identical object is a pedestrian or not, based on the accumulated scores.

Additionally, in particular, if at the object recognition unit 32 an object A detected within the image at No. (n−1) frame and an object B detected within the image at No. n frame are the same, a unique ID number is given to the identical object detected within these plural frames. Through this ID number, information showing whether the object is a pedestrian or not, and information relating to the object's movements, etc. are managed.

In this present embodiment, the processings for pedestrian identification are arrived at through pedestrian discrimination processing and score accumulation judgment processing. These pedestrian discrimination processings and accumulation judgment processings are, respectively, done for each successive frame, regarding an object detected at 1 frame's picture.

At the pedestrian discrimination processing, via processing resembling the pedestrian identification processing of the first embodiment, it is determined whether objects included within each frame is a pedestrian or not.

At the score accumulation judgment processing, scores are set beforehand for an object, according to those discrimination results. Scores are accumulated for the same object appearing in plural frames. And, based on the accumulated scores, it is determined whether the same body in the plural frames is a pedestrian or not.

For the pedestrian identification handling of the first embodiment, the judgment of whether or not an object appearing in 1 frame is a pedestrian, directly connected with an identification of whether or not the object is a pedestrian. For this, in the present embodiment, an identification of whether or not the object is a pedestrian is based on scores accumulated over plural frames, at the score accumulation judgment processing.

Figure 8:
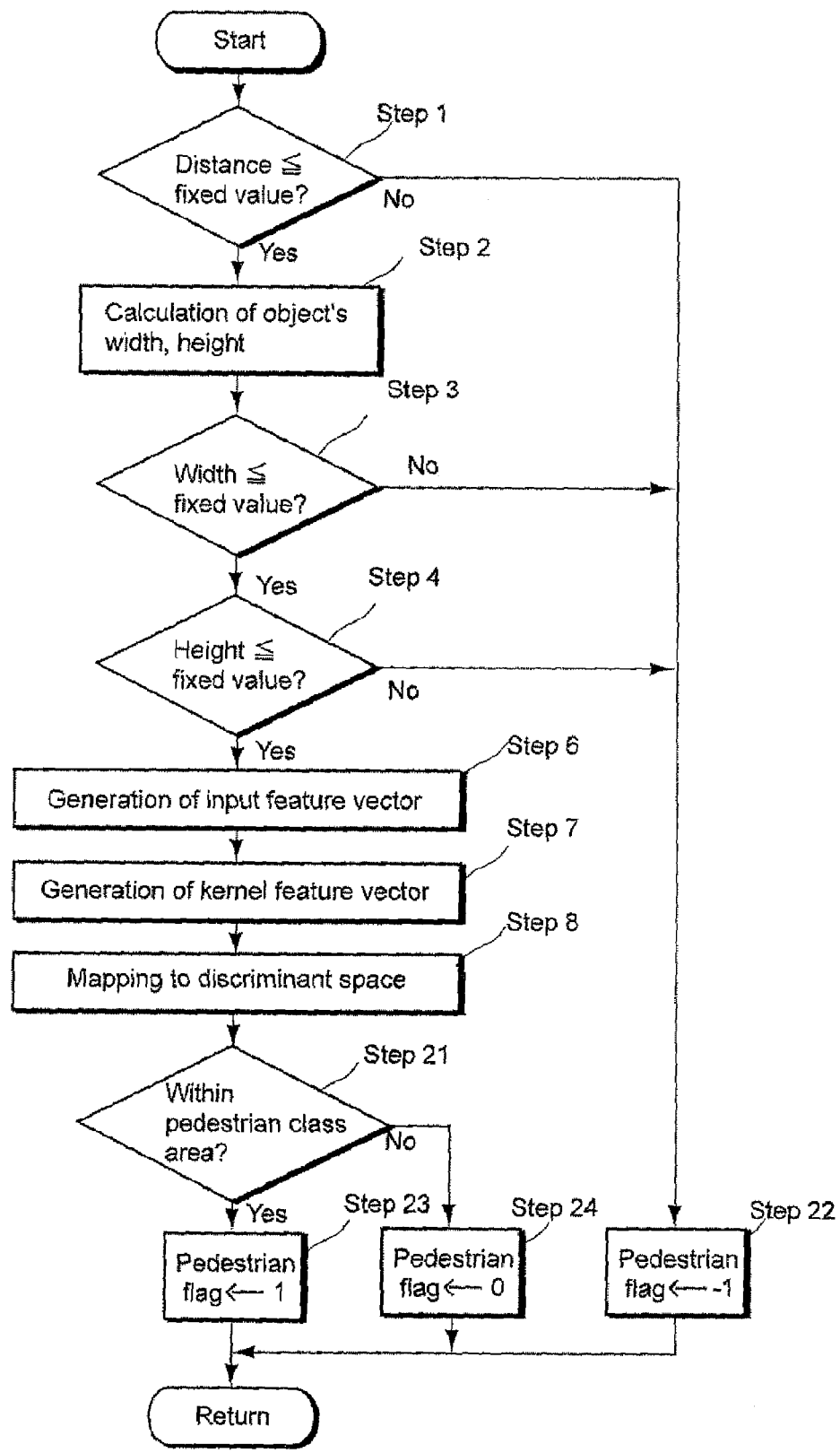
FIG. 8 is a flowchart showing a process for pedestrian discrimination handling.

FIG. 8 is a flowchart showing the detailed steps of the pedestrian discrimination processing. At Steps 1-4, if the preconditions for executing a pedestrian identification (Steps 6-8, 21) through kernel discriminant analysis of the object are not satisfied, then a pedestrian flag corresponding to the object's ID number is set to −1 at Step 22. Those preconditions are the same as for the first embodiment. They are that the distance from the object to the automotive vehicle is equal to or less than a fixed value, that the object's width is equal to or less than a fixed value, and also, that the object's height is equal to or less than a fixed value.

In addition, if the object satisfies those preconditions, at Steps 6-8 the input feature vector u is generated and the operations related to kernel discriminant analysis are done.

Successively, at Step 21 the pedestrian flag is set to 1 or 0, based on the judgment at the discriminant space. In other words, if an affirmative determination is made at Step 21 and the vector mapped to the discriminant space is within the pedestrian class area, the pedestrian flag corresponding to the object's ID number is set to 1.

On the other hand, if a negative determination is made at Step 21 and the vector mapped to the discriminant space is not within the pedestrian class area, the pedestrian flag corresponding to this ID number is set to 0.

Figure 9:
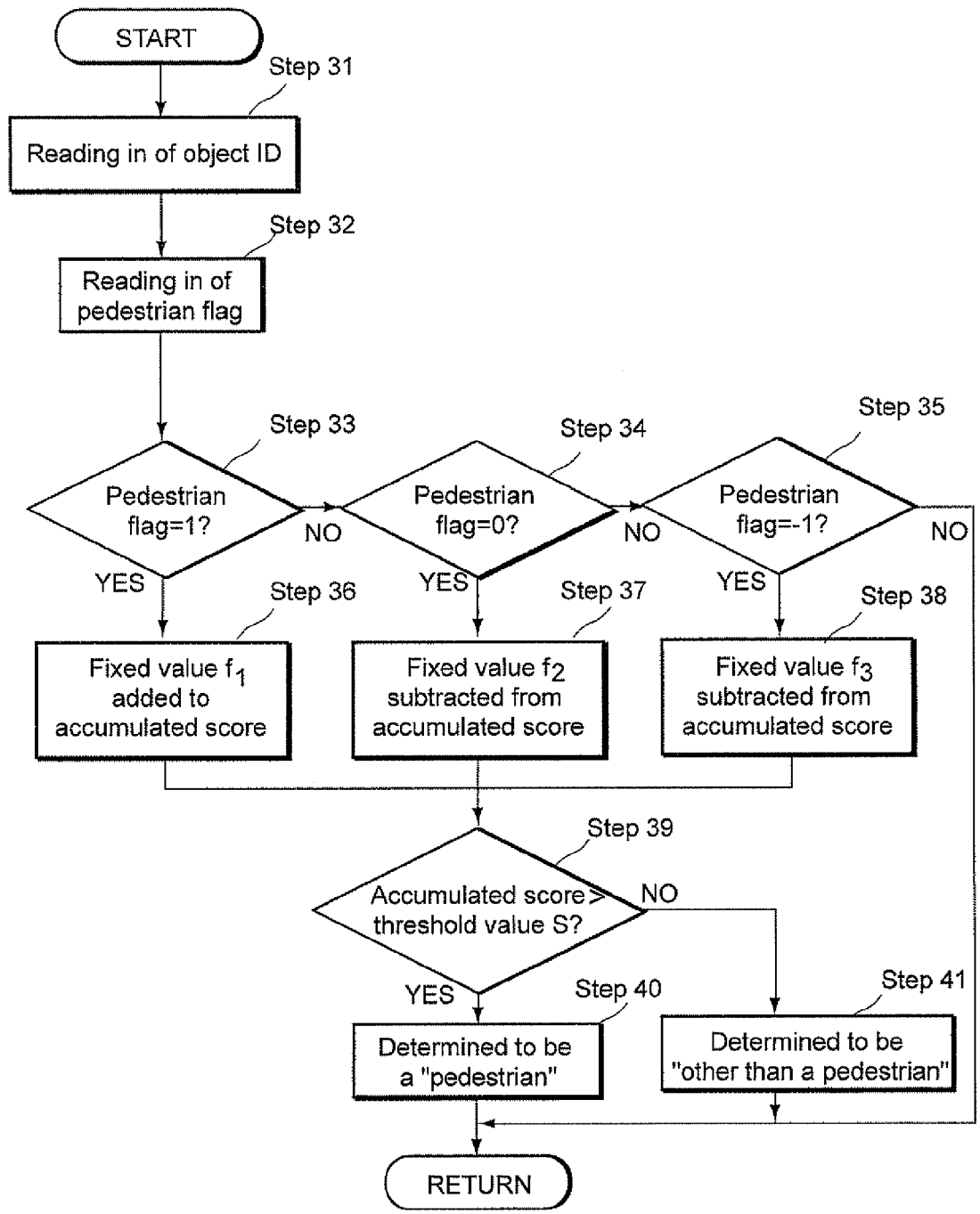
FIG. 9 is a flowchart showing a process for score accumulation judgment handling.

FIG. 9 is a flowchart showing the detailed steps of the score accumulation judgment processing. With this processing, depending on whether or not the preconditions for executing pedestrian identification via kernel discriminant analysis for an object, and depending on whether or not the object has been judged to be a pedestrian at the kernel discriminant analysis, an adjustment with a different fixed value is done for this object.

First, at Step 31 the ID number given to the object is read in, and the object to be the target of the processing is specified. Successively at Step 32, the pedestrian flag corresponding to this ID number is read in, and the processings of Steps 33-38 are provided. At Steps 33-35, it is determined whether the pedestrian flag is any of a 1, 0, or −1. At Steps 36-38, the score is adjusted depending on this pedestrian flag.

In other words, if an affirmative determination is made at Step 33 and the pedestrian flag is a 1, a fixed value of $f_1$ is added to the accumulated score at Step 36. This pedestrian flag is a 1 when, as established in the pedestrian discrimination processing described above, the object satisfies the above-mentioned preconditions and also, the discrimination result of the pedestrian discrimination processing is that the object is a pedestrian.

At Step 34, if an affirmative determination is made and the pedestrian flag is a 0, a fixed value $f_2$ is subtracted from the accumulated score at Step 37. The pedestrian flag is a 0 when the object satisfies the preconditions and also, the discrimination result of the pedestrian discrimination processing is that the object is not a pedestrian (it is a non-pedestrian).

Additionally, if at Step 35 an affirmative determination is made and the pedestrian flag is a −1, a fixed value of $f_3$ is subtracted from the accumulated score at Step 38. The pedestrian flag is a −1 when the object does not satisfy the preconditions. Here, the relationship shown in the following numerical formula 25 is maintained among the fixed values $f_1$, $f_2$, $f_3$ (all positive numbers).

$$f_2 < f_1,\ f_2 < f_3 < f_1 \quad \text{[Equation 25]}$$

That is, if the vector y mapped to the discriminant space is within the pedestrian area, fixed value $f_1$ is the value added to the object corresponding to this vector y. In addition, if this vector y is not within the pedestrian area, the fixed value $f_2$ is the value that is subtracted from that object. Here, this fixed value $f_2$ is set at a value that is smaller than the fixed value $f_1$.

Furthermore, if the preconditions for performing kernel discriminant analysis regarding the object are not satisfied, fixed value $f_3$ is the value subtracted from that object. This fixed value $f_3$ is set at a value that is smaller than fixed value $f_1$, and larger than fixed value $f_2$.

The setting of the sizes of these values, in cases where it is determined to be a pedestrian at the kernel discriminant analysis, presupposes that the probability of being a pedestrian is high, and particular weightings are done to the scores, for such cases. By this means, even if the image photographing conditions (including the above-mentioned presuppositions) that are advantageous for pedestrian identifications do not continue through all of the frames, stable identification results can still be obtained.

An object is specified, for a plurality of frames, through an ID number. However, at Steps 39-41, it is determined whether the object is a pedestrian or not, based on the whether or not an accumulated score for the same object is greater than a fixed value. At Step 39, it is determined whether or not the accumulated score is greater than a threshold value S.

If an affirmative determination is made at Step 39 and the accumulated score is greater than the threshold value S, this object is judged a "pedestrian" at Step 40. On the other hand, if a negative determination is made at Step 39 and the accumulated score is less than the threshold value S, this object is judged a "non-pedestrian" at Step 41.

According to the present embodiment, for the same object within a plurality of frames, a score showing the pedestrian resemblance of the object, is accumulated. When the accumulated score becomes larger than a fixed value, this object is determined to be a pedestrian. Because of this, one can raise the accuracy of pedestrian identifications, beyond that of an identification for only 1 frame.

Third Embodiment

Figure 10:
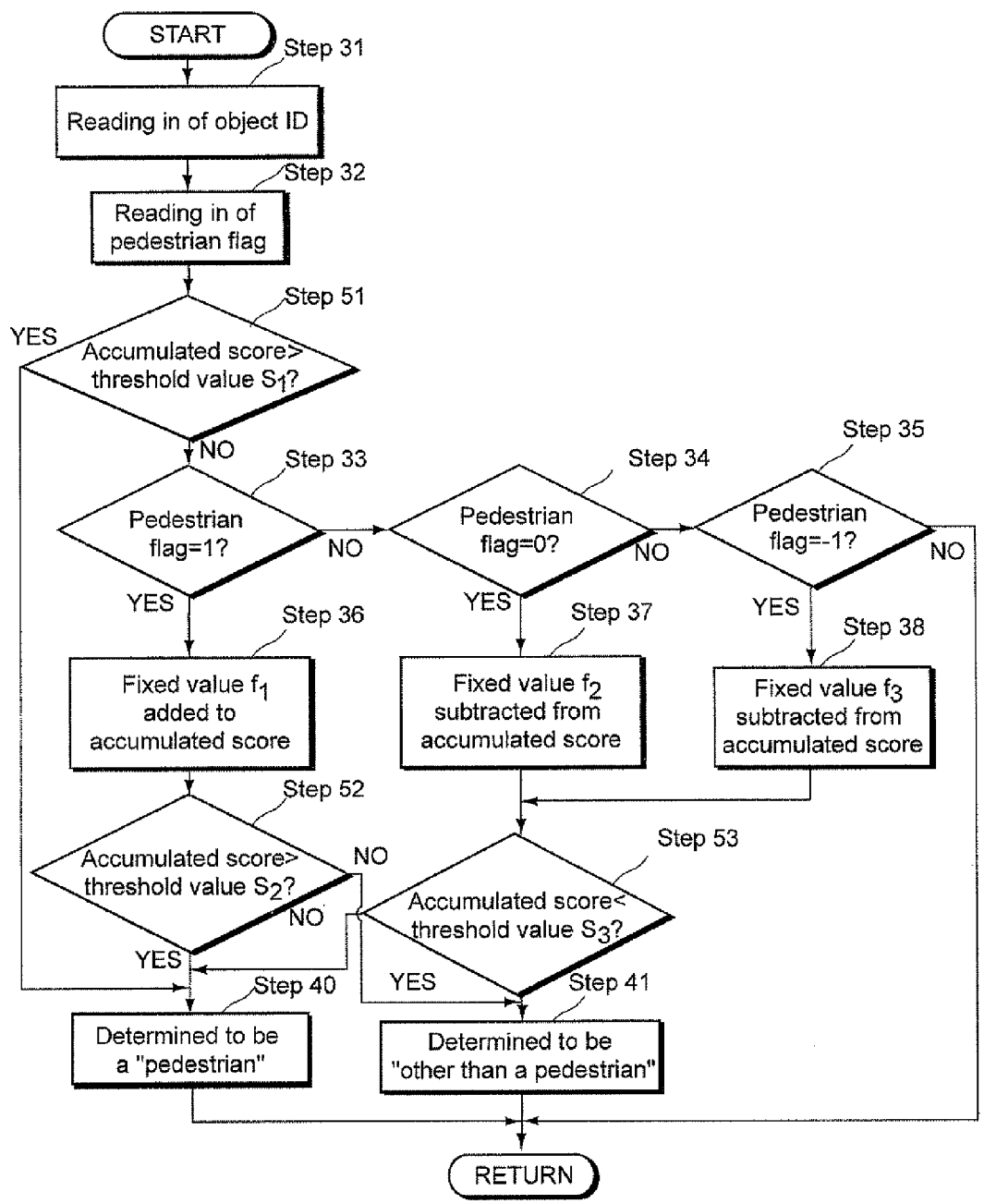
FIG. 10 is a flowchart showing a process for score accumulation judgment handling related to a third embodiment.

FIG. 10 is a flowchart showing the detailed steps of the score accumulation judgment processing of the stereo image processing unit relating to a third embodiment. The configuration of the present stereo image processing unit follows that of the second embodiment. Here also, similarly to the second embodiment, an accumulation of scores regarding the same object in a plurality of frames, and a determination based on the accumulated scores, are performed for each successive frame.

Additionally, depending on the results of kernel discriminant analysis at the current frame, the accumulated score at the previous frame for the object is increased or decreased.

One feature of the present processing exists at the handling for when the accumulated score for the same object, up to the previous frame, is a sufficiently large value. In other words if, in this handling, the score accumulated for the object up to the previous frame is greater than a threshold value $S_1$, then that object is determined to be a pedestrian without doing a processing for the score accumulation at the current frame. Through this type of determination, once it is decided at the processing time of a certain frame that the object is a pedestrian, it is possible to reduce the later operations.

In addition, one of the other features of the present handling is, depending on whether or not the accumulated score is greater than a fixed value, hysteresis can be provided. In other words, a threshold value $S_2$ for when the accumulated score is increasing, and a threshold value $S_3$ for when the accumulated score is decreasing, are each separately established. Here, this threshold value $S_3$ is set to be a smaller value than the threshold value $S_2$.

By means of this hysteresis, it is possible to prevent "hunting" for an identification result (when the accumulated score at each frame goes up and down in the neighborhood of the threshold value, and the identification result becomes an unstable condition where it is a pedestrian, then a non-pedestrian, etc.).

With the present embodiment's stereo image processing unit's score accumulation judgment processing, the following two points of the above-described 2 features, differ from the second embodiment's stereo image processing unit 12. They are the points that the determination at Step 51 is inserted at the step prior to the handling of the score accumulation at Steps 33-38, and that the determinations at Steps 52, 53 replace the determination at Step 39 (FIG. 9).

Regarding Step 51, which is one of those features, it is judged whether or not the accumulated score for the object up to the previous frame is greater than a sufficiently large value $S_1$. If an affirmative determination is made at Step 51 and this accumulated score is greater than the value $S_1$, then Steps 33-38, 52, 53 are skipped, and one proceeds to Step 40. At Step 40, the object specified at Step 31 is determined to be a pedestrian.

If a negative determination is made at Step 51 and the accumulated score is less than the threshold value $S_1$, then accumulation processing of the score is performed at Steps 33-38, similarly to the second embodiment.

Additionally, regarding Steps 52, 53 which make up the other single feature, when increasing the accumulated score or when decreasing the accumulated score, immediately following that, the threshold value for determining whether or not that object is a pedestrian then varies. In other words, the value $S_3$ for when decreasing the accumulated score is set to be smaller than the value $S_2$ for when increasing it.

Because of this, after an addition is done to the accumulated score at Step 36, then one continues to proceed to Step 52. After a subtraction is done to the accumulated score at Step 37 or Step 38, then one continues to proceed to Step 53.

At Step 52, if the accumulated score which was increased at step 36 is greater than the threshold value $S_2$, then that object is determined to be a pedestrian. Also, at Step 53, if the accumulated value which was decreased at step 37 or 38 is less than the threshold value $S_3$, then that object is determined to be other than a pedestrian.

According to the present embodiment, when the score accumulated up to the previous frame is greater than a fixed threshold value, this object is determined to be a pedestrian. By means of such a judgment, processing regarding score accumulation is not performed for the object within the current frame. Because of this, operations can be reduced.

Also, in accordance with the present embodiment, according to the determination result regarding the object for 1 frame's image (the data based on it), the fixed value is adjusted, while the score is accumulated. Then, if the accumulated score is greater than the fixed threshold value, the same object at a plurality of frames is determined to be a pedestrian.

Along with this, if the accumulated score is smaller than this fixed threshold value, the above-mentioned same object is determined to not be a pedestrian. In other words, the difference between the 2 threshold values are made to be proper to provide hysteresis. Through this, "hunting" can be prevented, and an identification result that is further stabilized can be outputted.

Still further, the above-described embodiments have been explained regarding examples using a near-infrared ray responsive camera. However, the present invention is not limited to this, and visible light cameras can also be used.

What is claimed is:

1. An image processing equipment for performing kernel discriminant analysis based on a photographed image of an object comprising:
   an input feature vector generation unit for generating, based on data related to said image, an input feature vector including as elements a size of said object, a side portion shape of said object, and an upper portion shape of said object;
   a discriminant analysis operations unit for generating a vector mapped to a discriminant space, through performing the operations for kernel discriminant analysis based on said input feature vector; and
   an object determination unit for determining whether said object is a pedestrian or not, according to whether or not the vector mapped to said discriminant space exists within a fixed area at the discriminant space.

2. The image processing equipment of claim 1, wherein the size of said object includes an absolute size width and an absolute size length, calculated based on an area in which the concerned object was photographed and on a distance to the concerned object.

3. The image processing equipment of claim 1, wherein at respective sections from dividing at a fixed width in a horizontal direction, an area in which the concerned object was photographed, the upper portion shape of said object is characterized through representative values of the object's lengths in a vertical direction from a bottom edge of said area to a top edge of said object.

4. The image processing equipment of claim 3, wherein said input feature vector generation unit normalizes said representative values for height in the vertical direction, and normalizes a number of the sections to a fixed number, as elements of said input feature vector.

5. The image processing equipment of claim 1, wherein at respective sections from dividing at a fixed width in a vertical direction, an area in which the concerned object was photographed, the side portion shape of said object is characterized through representative values of the object's lengths in a horizontal direction, from a right edge of said area to a left edge of said object, and through representative values of the object's lengths from a left edge of said area to a right edge of said object.

6. The image processing equipment of claim 5, wherein said input feature vector generation unit normalizes said representative values of the object's length from the right edge of said area to the left edge of said object, for width in the horizontal direction,
   normalizes said representative values of the object's length from the left edge of said area to the right edge of said object, for width in the horizontal direction, and
   normalizes a number of the sections to a fixed number.

7. The image processing equipment of claim 1, wherein said discriminant space is configured for said input feature vector using, as a base, an eigenvector of a fixed matrix related to a first training data of said objects being a pedestrian, and to a second training data of said objects being other than a pedestrian, and
   wherein said discriminant analysis operations unit generates a fixed kernel feature vector, based on said input feature vector related to said object which is generated through said input feature vector generation unit, and based on said first and said second training data stored in advance, and
   generates a vector mapped to said discriminant space, based on the concerned generated kernel feature vector and said matrix.

8. The image processing equipment of claim 2, further comprising a stereo camera for photographing a basis image and a comparison image corresponding to said basis image, and a stereo image processing unit for calculating parallax error for each fixed small area configuring said basis image, based on the photographed said basis image and said comparison image, and
   further comprising an object recognition unit for recognizing the existence of said object based on said calculated parallax error for the small areas, where said input feature vector generation unit generates said input feature vector based on said calculated parallax error regarding said recognized object.

9. The image processing equipment of claim 4, further comprising a stereo camera for photographing a basis image and a comparison image corresponding to said basis image, and a stereo image processing unit for calculating parallax error for each fixed small area configuring said basis image, based on the photographed said basis image and said comparison image, and
   further comprising an object recognition unit for recognizing the existence of said object based on said calculated parallax error for the small areas, where said input feature vector generation unit generates said input feature vector based on said calculated parallax error regarding said recognized object.

10. The image processing equipment of claim 6, further comprising a stereo camera for photographing a basis image and a comparison image corresponding to said basis image, and a stereo image processing unit for calculating parallax error for each fixed small area configuring said basis image, based on the photographed said basis image and said comparison image, and
   further comprising an object recognition unit for recognizing the existence of said object based on said calculated parallax error for the small areas, where said input feature vector generation unit generates said input feature vector based on said calculated parallax error regarding said recognized object.

11. The image processing equipment of claim 2, further comprising a score accumulation unit for accumulating fixed scores for the same object appearing at a series of plural frames, wherein a score expresses a likeness to a pedestrian of said object at an image of 1 frame and depends on a determination result related to said object through said object determination unit, and further comprising a score judgment unit for judging whether that same object at said plural frames is a pedestrian or not based on said accumulated score.

12. The image processing equipment of claim 4, further comprising a score accumulation unit for accumulating fixed scores for the same object appearing at a series of plural frames, wherein a score expresses a likeness to a pedestrian of said object at an image of 1 frame and depends on a determination result related to said object through said object determination unit, and further comprising a score judgment unit for judging whether that same object at said plural frames is a pedestrian or not, based on said accumulated score.

13. The image processing equipment of claim 6, further comprising a score accumulation unit for accumulating fixed scores for the same object appearing at a series of plural frames, wherein a score expresses a likeness to a pedestrian of said object at an image of 1 frame and depends on a determination result related to said object through said object determination unit, and further comprising a score judgment unit for judging whether that same object at said plural frames is a pedestrian or not, based on said accumulated score.

14. The image processing equipment of claim 9, wherein said score accumulation unit adds or subtracts a fixed value depending on the determination result of said object determination unit, and accumulates said scores, and if said accumulated score is larger than a fixed first threshold value, said score judgment unit judges that same object at said plural frames to be a pedestrian, and if said accumulated score is smaller than a fixed second threshold value, which is smaller than said first threshold value, said score judgment unit judges that same object to not be a pedestrian.

15. The image processing equipment of claim 9, further comprising a precondition judgment unit, for judging preconditions of whether or not to carry out pedestrian identification through kernel discriminant analysis regarding said object, and if a judgment result of said precondition judgment unit is that said object satisfies the preconditions and also a judgment result of said object determination unit is that said object is a pedestrian, then said score accumulation unit adds a first fixed value regarding said object; and if a judgment result of said precondition judgment unit is that said object satisfies the preconditions and also a judgment result of said object determination unit is that said object is other than a pedestrian, then said score accumulation unit subtracts a second fixed value, which is smaller than said first fixed value, regarding said object; and if a judgment result of said precondition judgment unit is that said object does not satisfy the preconditions, then said score accumulation unit subtracts a third fixed value which is larger than said second fixed value and smaller than said first fixed value, regarding said object.

16. The image processing equipment of claim 9, wherein the score accumulation regarding said object through said score accumulation unit and the judgment based on said accumulated scores through said score judgment unit, are carried out for each successive frame, and if the accumulated score for said same object up to a previous frame is larger than a fixed third threshold value, said accumulation of scores through said score accumulation unit is not performed, and said score judgment unit judges that the same object at said plural frames is a pedestrian.

17. The image processing equipment of claim 9, wherein the score accumulation regarding said object through said score accumulation unit and the judgment based on said accumulated scores through said score judgment unit, are carried out for each successive frame, and said score judgment unit prepares separately the respective threshold value for when the accumulated score is increasing and the threshold value for when the accumulated score is decreasing, and establishes the threshold value for when the accumulated score is decreasing to be smaller than the threshold value for when the accumulated score is increasing.

18. An image processing equipment for distinguishing pedestrians based on a photographed image of an object comprising:

an input feature vector generation unit for generating, based on data related to said image, an input feature vector including as elements said objects size, said object's upper portion shape, and said object's side portion shape;

an operations unit for generating a vector mapped to a specified space, based on said input feature vector; and an object determination unit for determining whether said object is a pedestrian or not, depending on whether or not the vector mapped to said specified space is within a specified area at the space, which has established an identification boundary.

* * * * *